Jan. 12, 1926.  
J. A. CAIN  
AUTOMATIC BLOCKING HOE  
Original Filed Dec. 1, 1921    3 Sheets-Sheet 3
1,569,070
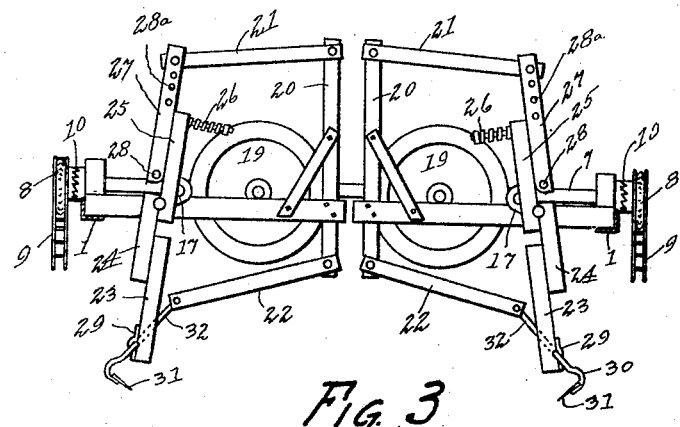
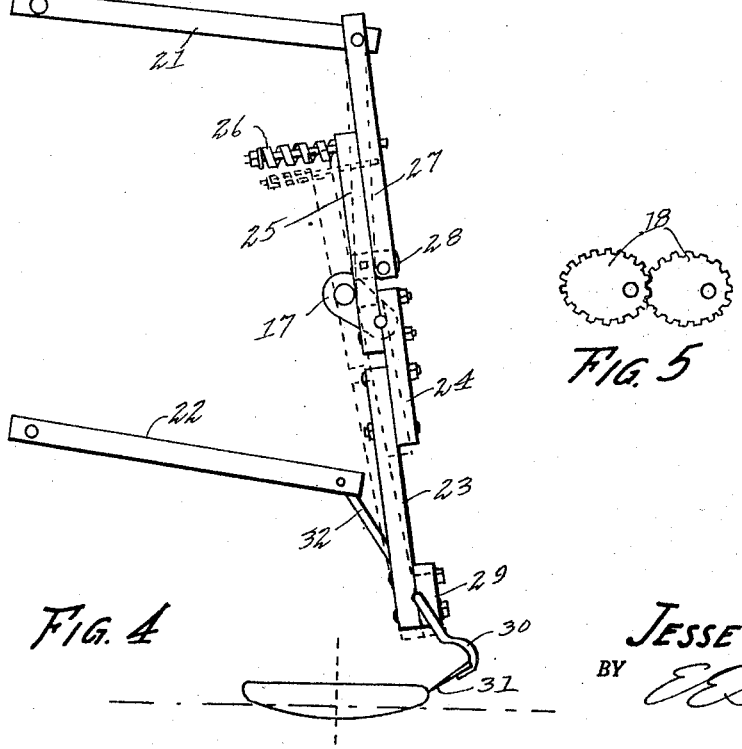
INVENTOR.  
JESSE A. CAIN  
BY  
ATTORNEYS.

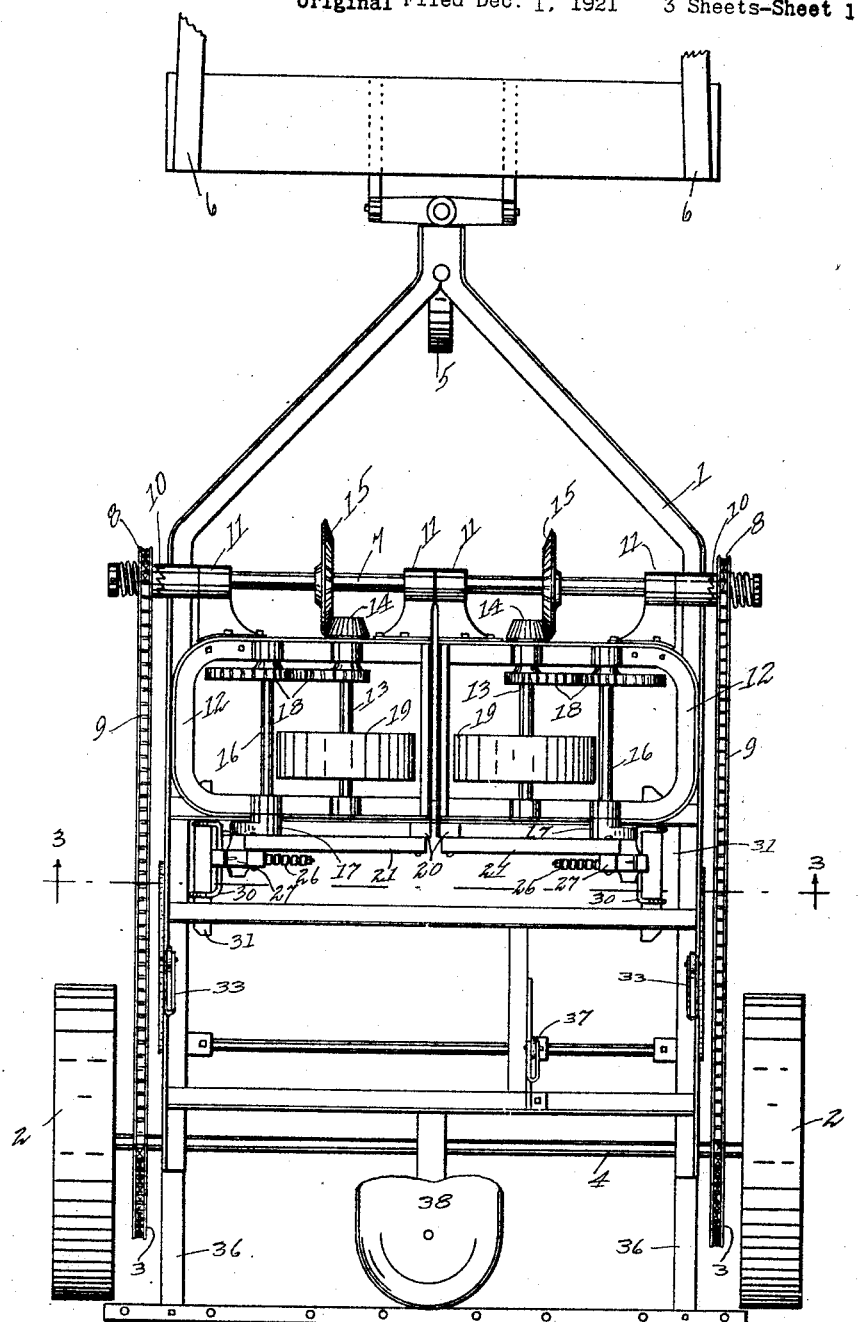

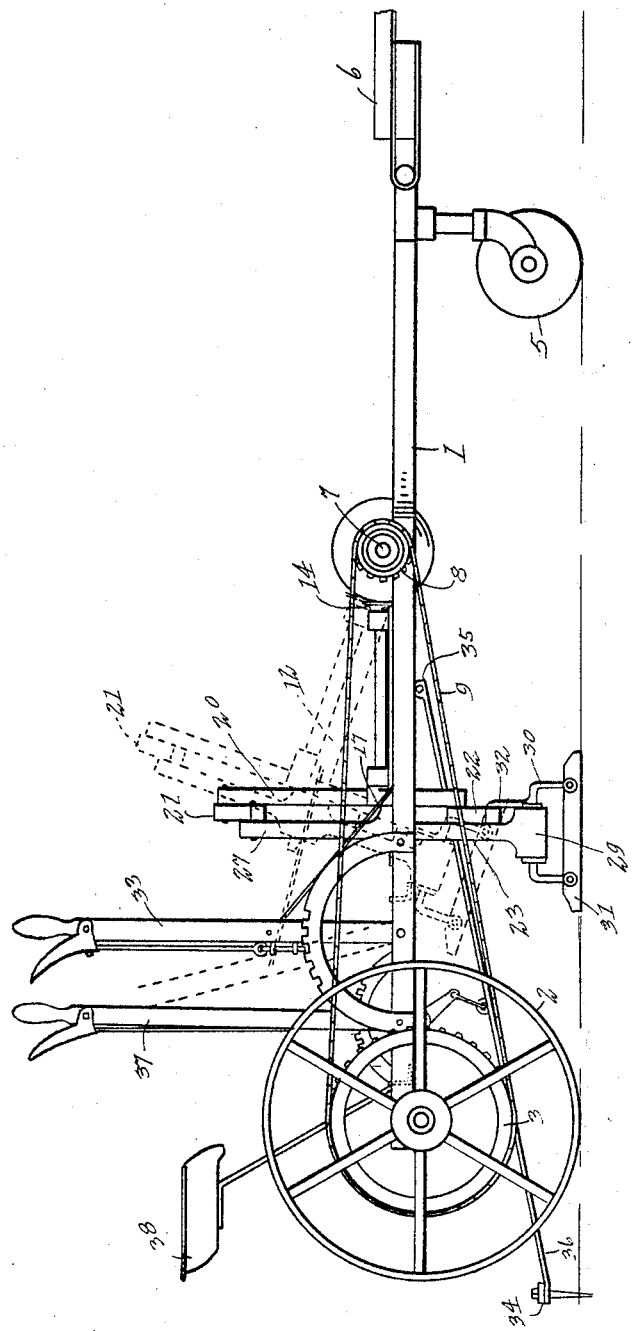

Patented Jan. 12, 1926.

1,569,070

UNITED STATES PATENT OFFICE.

JESSE A. CAIN, OF BEND, OREGON, ASSIGNOR TO BEET MACHINERY COMPANY, OF WALLA WALLA, WASHINGTON, A PARTNERSHIP.

AUTOMATIC BLOCKING HOE.

Application filed December 1, 1921, Serial No. 519,068. Renewed March 16, 1925.

*To all whom it may concern:*

Be it known that I, JESSE A. CAIN, a citizen of the United States, residing at Bend, in the county of Crook and State of Oregon, have invented certain new and useful Improvements in Automatic Blocking Hoes, of which the following is a specification.

This invention relates to blocking hoes, such as are used more particularly for spacing beets, and like plants, in a row.

One object of the invention is to provide a blocking hoe that will produce a fixed result.

Another object of the invention is to provide a motion to the cutting stroke of a blocking hoe that is similar to manual operation.

A further object of the invention is to provide a hoe that is rapid in action.

A further object of the invention is to provide a hoe whose operation is synchronous with the movement of the implement.

A further object of the invention is to provide a hoe which can be raised from the soil and be thus rendered inoperative.

A further object of the invention is to provide an implement that will block a plurality of rows at one time.

A further object of the invention is to provide an implement having a plurality of hoes wherein one or more of the hoes may be rendered inoperative, irrespective of the others.

A further object of the invention is to provide a blocking hoe implement to which a cultivating attachmnt may be conveniently added.

With these and other objects in view reference is now had to the accompanying drawings in which—

Fig. 1 is a plan view of the implement;

Fig. 2 is a side elevation thereof;

Fig. 3 is a rear elevation of the operating mechanism taken on the line 3—3 of Fig. 1;

Fig. 4 is an enlarged rear view of one of the hoes and hoe levers; and

Fig. 5 is a rear elevation of the eccentric gears.

Having reference to the drawings like numerals refer to like parts throughout the several views and the numeral 1 refers to the frame of the implement which is supported by driving wheels 2 suitably attached thereto.

Sprocket wheels 3 are rigidly attached to the axle 4 of the driving wheels to rotate therewith to drive the operating mechanism which will be presently explained.

A caster or other wheel 5 supports the front end of the frame, to which is suitably attached a pair of shafts 6 or other draft means whereby the implement is to be propelled.

Revolubly mounted on the front end of the frame is a line shaft 7 carrying on its outer ends sprocket wheels 8 which with the line shaft 7 are driven by the chain belts 9 from the sprocket wheel 3 in the usual manner.

Preferably mounted on the line shaft are ratchets 10 of the usual style which provide means to disconnect the mechanism when backing or turning, and as they are old in the art further description is deemed unnecessary.

Hingedly mounted on the line shaft is the operating mechanism which consists of hinge members 11 through which the line shaft passes. The hinge members are rigidly attached to the movable frames 12 so that these movable frames may be raised or lowered, as shown by the dotted lines in Fig. 2, to adjust the depth of cut of the hoe in the ground, or to raise the hoe out of the ground for transportation.

The implement shown is provided with two independent units, each consisting of the operating mechanism and one hoe, and obviously one or a plurality of units may be used. In the description of the operating mechanism one unit only will be covered as they are uniformly alike.

In the movable frame 12 is journalled a main shaft 13 which is extended forward and which terminates in a bevel pinion 14, which in turn engages the bevel gear 15 attached to the line shaft. A counter shaft 16 is also journalled in the frame paralleling the main shaft 13 and terminates at its rearward end in a crank 17, and both shafts carry eccentric gears 18 positioned in operable contact, while the main shaft carries a fly wheel 19 wherewith to counter-balance the operating mechanism, a counter balance being deemed essential as the work of the hoe passing through the soil is intermittent, due primarily to the action of the elliptical gears 18.

The rearward end of the movable frame carries the hoe support which consists of a post 20 which is rigidly attached to and moves with the movable frame as it is raised or lowered. At the upper and lower extremities of the post, and pivotally attached thereto, and extending therefrom is an upper arm 21 and a lower arm 22. Attached centrally to the crank 17 is the hoe lever which consists of a main bar 23, a splice bar 24 for adjustment purposes, a spring bar 25 which carries a spring 26, and a yieldingly mounted bar 27 attached at one end to the spring bar 25 by the hinge 28, and at the other end to the upper arm 21 and provided with adjusting holes 28ª.

The lower end of the main bar 23 carries a box 29 in which is journalled a U shaped member 30 which depends therefrom to support the hoe 31 and which is provided with an arm 32 extended to pivotally engage the free end of the lower arm 22.

By this means, a reciprocatory and oscillatory motion will be imparted to the hoe.

Where two or more hoes are used they are spaced so that their center of action is directly over the row of plants to be hoed. This center of action is shown by the dotted line passing through the diagram in Fig. 4, the diagram also showing the path described by the hoe.

To raise and lower the movable frame 12, and with it the hoe 31, operating levers 33 of the usual type are provided.

A cultivator 34 is conveniently attached to the implement by means of the hinge 35 and the longitudinal bars 36 and an operating lever 37 for raising and lowering purposes is provided.

A seat 38 may also be provided if desired.

In use the implement operates as follows:

Obviously any prime mover may be used to draw the implement over the ground, which movement will rotate the drive wheels 2, the sprocket wheels 3 whether attached to the drive wheels or to the shaft 4, in either manner will rotate with the drive wheels to transmit power to the pinions 8 and the shaft 7 through the medium of the chain belts 9.

The bevel gear 15 attached to the shaft 7 engages a bevel pinion 14, with the gear ratio relatively high to impart a high speed to the main shaft 13 which, with the counter shaft 16 is suitably journalled in the movable frame 12.

The main shaft 13 carries an elliptical gear 18 and a balance wheel 19, while the counter shaft, paralleling the main shaft, carries also an elliptical gear 18 engageable with the first mentioned elliptical gear, whereby a rotary motion of variable speed is imparted to the counter shaft.

The counter shaft 16 terminates at its rearward end in a crank 17 which in turn operably engages the spring bar 25 and the splice bar 24, these two with the main bar 23 and the yieldingly mounted bar 27, forming the hoe lever.

The eccentric gears now impart the above mentioned variable speed to the hoe lever which is attached to the fixed upright 20 in pantographic form to produce the movement to the hoe 31 shown in the diagram in Fig. 4.

Obviously without the pantographic connections the diagram would form practically a perfect ellipse which is very undesirable as there would be too much lost motion in the return stroke and the cutting stroke would be of too great a depth causing excessive strain on the mechanism and moving an unnecessary amount of dirt, and further leaving a depression requiring an extra amount of work to refill.

In the design shown the hoe makes a quick, clean cut of sufficient depth to sever the young plant or to throw them completely out of the ground, and returns with a comparatively slow motion so that the whole movement is synchronized with the movement of the implement, and in such a manner that the continuous, regular, movement of the implement will not cause the hoe to drag in the ground.

In practice a space of 10 inches is blocked out with 2 inches left untouched which plainly indicates that the speed of the hoe must be very rapid in the cutting direction to prevent dragging. Adding to this a movement of the hoe corresponding to the manual movement which is ideal I find that the movement is as shown in the diagram and that it can be properly obtained by the pantographic motion.

During the operation of the hoe should an obstruction be met by the hoe itself, such as a rock, the spring 26 will permit the crank 17 to complete its rotation without damage to the machinery.

During the blocking operation the cultivator may be dropped and thus cultivation may be accomplished while blocking.

Having thus described my invention, I claim—

1. In a cotton chopper, a frame, driving wheels attached to said frame, a line shaft mounted on the front end of said frame, means to drive the line shaft from the driving wheels, an operating mechanism consisting of a frame hingedly mounted on and extending rearward from the line shaft, and having a main shaft journalled in the frame carrying a fly wheel, and terminating forward of the frame in a bevel pinion, a counter shaft journalled in the frame and terminating rearwardly in a crank, and eccentric gears mounted on said main and counter shaft in operable contact, a bevel gear mounted on the line shaft and positioned in operable contact with said bevel pinion, a yielding hoe lever attached to said crank and carrying a hoe at its lower end, and means to raise or lower the rear end of said frame in a vertical plane about said line shaft.

2. In a cotton chopper, a frame, driving wheels attached to said frame, a line shaft mounted on the front end of said frame, means to rotate the line shaft from the driving wheels, a frame pivoted on the line shaft and extending rearward, a crank extending rearward from the frame, a driving connection between the line shaft and the crank, operative in any position of the frame, hoe levers operably attached to the crank, and to a post rigidly attached to the pivoted frame, said hoe levers comprising an upper and a lower arm extending from said post and pivotally mounted thereon, a lever centrally mounted on said crank and pivotally attached to the upper arm, said lever carrying at its upper end a yieldably mounted bar hinged thereto and at its lower end a U shaped member journalled therein, said member depending therefrom and carrying a hoe, and provided with an extended arm the upper end of which is pivotally attached to said lower arm, and means to adjust said operating mechanism.

3. In a cotton chopper, a frame, driving wheels supporting said frame, a line shaft mounted on the forward end of said frame, means for driving the line shaft from said driving wheels, a frame hingedly mounted on and extended rearwardly from the line shaft and having a main shaft journalled in the frame carrying a fly wheel, and terminating forward of the frame in a bevel pinion, said pinion being positioned in operable contact wth a bevel gear attached to said line shaft, a counter shaft journalled in the frame and terminating rearwardly in a crank, eccentric gears mounted on said main and counter shaft in operable contact, a post rigidly attached to the rear of said frame and carrying an upper and a lower arm pivotally attached thereto and extended therefrom, a hoe lever operably attached to the crank and comprising an adjustable and yielding main bar, attached at one end to said upper arm, a U shaped member journalled in the lower end of said main bar and carrying a hoe on its depending end, and having an arm extended to pivotally engage the free end of said lower arm, and means for raising or lowering said frame in a vertical plane about said line shaft.

In testimony whereof I affix my signature.

JESSE A. CAIN.